United States Patent Office 3,223,240
Patented Dec. 14, 1965

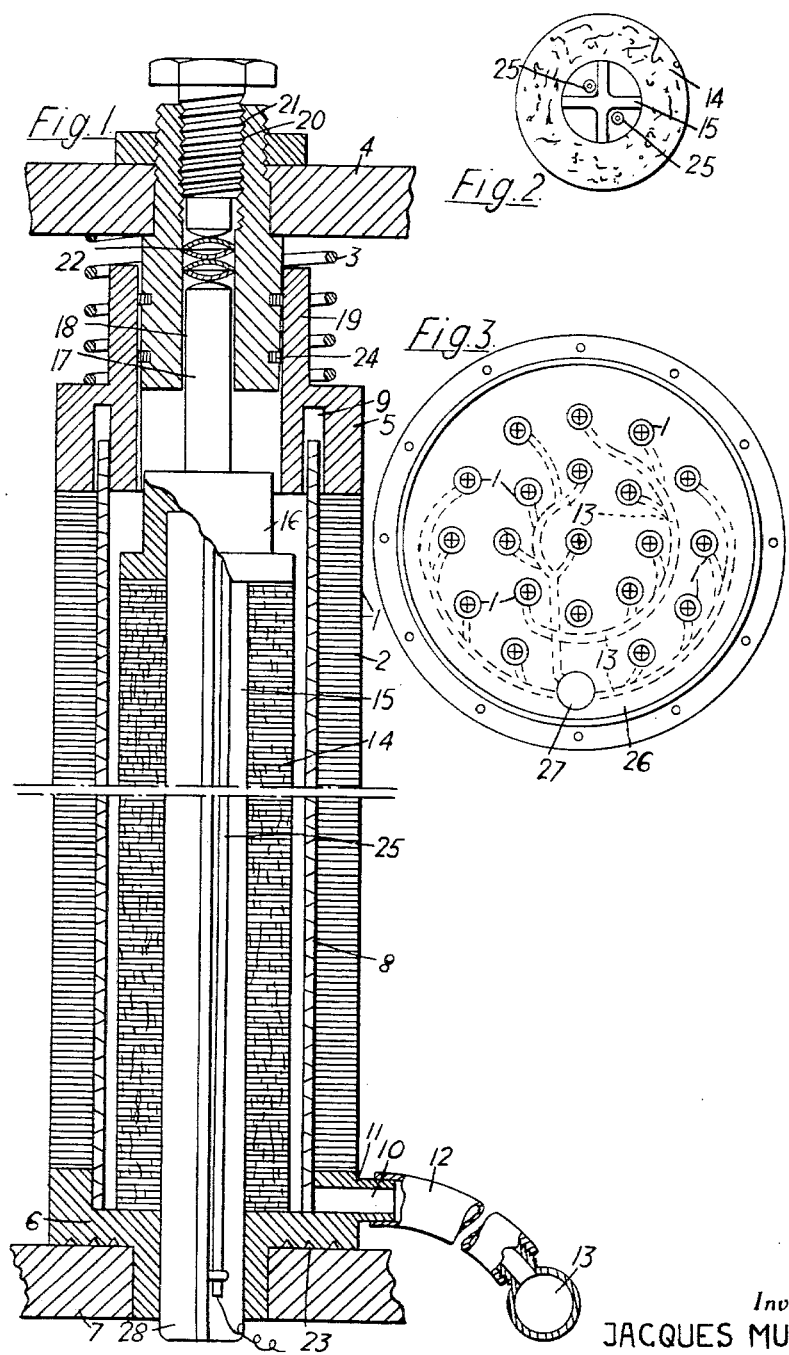

3,223,240
FILTER CARTRIDGE FOR SEPARATOR
Jacques Muller, La Garenne-Colombes, Seine, France, assignor to Rellumit Inter, S.a.r.L., La Garenne-Colombes, France, a corporation of France
Filed Dec. 19, 1961, Ser. No. 160,469
Claims priority, application France, Dec. 20, 1960, 847,435
1 Claim. (Cl. 210—96)

This invention relates to filter cartridges intended for the separation of condensation liquid from another liquid of different density, for example, an aqueous liquid from a hydrocarbon liquid, and more particularly to the separation of water from the fuel used in jet or other aircraft engines in order to prevent icing of the fuel, the consequence of which may be serious, especially when the aircraft is flying at high altitudes in the course of a flight of long duration. The formation of ice in the fuel may result in a serious accident.

Numerous types of separator for immiscible liquids of different densities are already known but the filter cartridge according to the invention is distinguished from the known types in that it not only provides for the separation of the aqueous liquid from the hydrocarbon liquid but provides further that if the separation should for any reason be inadequate, so that a certain amount of the aqueous liquid is still left in the hydrocarbon liquid after separation, the operation of the separator is automatically stopped in time.

One object of the invention is to provide means for separating aqueous and hydrocarbon liquids such as water and fuel oil, in which the hydrocarbon liquid after separation is passed through a further filtering device which absorbs any aqueous liquid which may be present and thereby swells, so that in time it completely blocks the flow of the hydrocarbon liquid.

Another object is to provide a filter cartridge containing a hydrophobic column through which the liquids are passed for separation and a hydrophilic column through which the hydrocarbon liquid is subsequently passed, the material constituting the hydrophilic column swelling and increasing its volume by absorption of the aqueous liquid so that the continued presence of the aqueous liquid in the hydrocarbon in time causes the hydrophilic column to block itself.

A further object is to provide a filter cartridge for the separation of water from fuel oil containing two concentric columns, the outer column being of hydrophobic material and the inner column being of hydrophilic material, the mixture of liquids being forced through the hydrophobic column where the water is coalesced into vesicular droplets which gravitate to the bottom of the space between the hydrophobic and hydrophilic columns, the separated fuel passing through the hydrophilic column where any unseparated water is absorbed.

Other and further objects of the invention will become apparent from a study of the subjoined specification and the accompanying drawings, in which:

FIGURE 1 is a longitudinal section of a filtering cartridge according to the invention;

FIGURE 2 is a cross-section of the inner column showing the support for the absorbent element and comprising a heating device; and FIGURE 3 is a plan view of a water separator for fuel oil comprising an assembly of filtering cartridges according to the invention.

Referring to the drawings a filtering cartridge 1 (FIGURE 1) consists of a hydrophobic column 2, that is, a column composed of material which will not absorb water, made up of a number of filtering rings. They may, for example, be made of impregnated paper treated with silicones and are pressed into contact with each other by a spring 3 bearing at one end against a support plate 4 (which may represent a part of the casing of the separating device) and at its other end against an abutment member 5 adapted for axial sliding movement. The lower end of the column rests on a base member 6 resting on a further support plate 7.

To prevent deformation of the column the siliconed rings are assembled on a perforated tubular member 8 which is perforated to allow a ready flow of liquid through it. One end of the tube 8 rests against the base member 6 and the other end projects into a groove 9 in the abutment member 5, the groove being of sufficient depth to allow axial movement of the member 5.

A liquid connection 11 projects outwardly from the base member 6 and is adapted to have a tube 12 connected to it so that liquid falling to the bottom of the space inside the column 2 may pass through a duct 10 and a tube 12 into a pipe 13.

Concentric with the hydrophobic column 2 and inside it is a hydrophilic or water-absorbent column 14 formed of an assembly of hydrophilic rings, such as paper, pressed against each other and supported on a central member 15. The latter may be in the form of a spider having a cruciform section, as shown in FIGURE 2, or may be in the form of a perforated tube. The upper end of the support member 15 is attached to an end block 16 which rests on the stack of rings comprising the hydrophilic column 14 and has an upwardly projecting pin 17 which is engaged in a bore 18 in an upper member 19 fixed to the upper support plate 4. The outer diameter of the upper member 19 passes through the bore in the abutment member 5 and locates it, there being two ring seals 24 or their equivalent to prevent the flow of liquid between the members 19 and 5. The lower end of the column 14 is supported on the base member 6.

The upper member 19 extends through the plate 4 and is secured thereto by a nut. The upper end of the bore 18 is screw-threaded at 20 and an adjusting screw 21 is engaged in the thread, the lower end of the adjusting screw bearing against an assembly of dished springs 22 by which adjustable spring pressure may be applied through the end block 16 to the hydrophilic column 14 to enable the liquid passing through the latter to be purified to the desired degree.

A hydraulic joint 23 provides for the sealing of the lower member 6 against the plate 7.

To provide for the drying out of the hydrophilic column 14 after it has absorbed a quantity of water an electric heater 25 is provided extending over the entire length of the support 15.

The cartridge as described may be used on its own, being connected in a transfer pipe line, or a group of such cartridges may be assembled together in a water separator 26 as shown in FIGURE 3, the tubes 13 being connected to a collector 27 provided with an external cock (not shown) for discharging the collected water.

The operation of the cartridge is as follows. The fuel arrives under pressure at the outside of the cartridge and passes in a radial direction through the hydrophobic column 2, which provides separation and concentration of any water contained in the fuel into vesicular droplets. This water gravitates to the bottom of the annular space between the hydrophobic and the hydrophilic columns and is led away through the duct 10 to the tube 13 to be discharged. The fuel continues its radial course and passes through the hydrophilic column 14 and emerges at the exit 21 to a transfer pipe line (not shown) connected to the fuel tank of the aircraft or other receptacle.

Should the separation achieved by the hydrophobic column 2 be incomplete for any reason the traces of water left therein find their way into the column 14 where the water comes into contact with the hydrophilic rings. The rings absorb the water and, in consequence, they swell. The pressure holding the rings in contact is thereby increased and if water continues to arrive with the fuel a point is eventually reached at which the pressure in the hydrophilic column 14 is so high that fuel is no longer able to pass through the column and the cartridge ceases to operate. This provides an absolute guarantee of safety in preventing water from passing through the cartridge with the fuel.

To facilitate the clearance of the hydrophilic column 2 when a large amount of water has been absorbed the column 14 may be rapidly dried, after the cartridge has been completely emptied, by energizing the heater 25 so that the water contained in the column is evaporated and removed.

It will be evident that the form and arrangement of the cartridge may be modified without departing from the scope of the invention.

I claim:

A two-stage filter cartridge for separating water from fuel oil, comprising supporting structure, a first stage outer filter column built up of rings of hydrophobic material through which the fuel oil and water are passed from the outside and in which the water is coalesced into vesicular droplets, said rings being treated with silicones and assembled on a perforated tubular support, a second stage inner column of smaller diameter built up of rings of water-absorbent sheet material assembled on a central support, a base member mounted on said supporting structure, said outer column resting upon said base member and said inner column being inside said outer column resting on said base member with an annular space between the two columns, a duct in said base member communicating with said annular space for conducting separated water away from the cartridge, an abutment member on the upper end of said first column and first spring means acting upon said abutment member to keep the rings constituting said outer column in close contact with each other, an end block resting on the upper end of said inner column, said end block having an upwardly projecting stem and second spring means acting on said end block to apply pressure to said second column to keep the rings thereof firmly in contact with each other, an upper member supported in said supporting structure, said upper member having a central bore in which said stem is slidably engaged, said second spring means being contained in the bore above said stem, and comprising adjusting means including a screw engaged in the upper member acting downwardly upon said spring means, said abutment member being formed to slide axially of the cartridge on said upper member, and fluid sealing means between said abutment member and said upper member to prevent leakage of fluid therebetween.

References Cited by the Examiner
UNITED STATES PATENTS

| | | | |
|---|---|---|---|
| 1,075,978 | 10/1913 | Joerin et al. | 210—184 X |
| 2,103,434 | 12/1937 | Pennebaker | 210—185 |
| 2,555,607 | 6/1951 | Robinson. | |
| 2,651,414 | 9/1953 | Lawson | 210—338 X |
| 2,725,986 | 12/1955 | Marvel | 210—315 |
| 2,864,505 | 12/1958 | Kasten | 210—315 |
| 3,034,656 | 5/1962 | Kasten | 210—96 X |

REUBEN FRIEDMAN, *Primary Examiner.*

HERBERT L. MARTIN, *Examiner.*